US010882459B2

(12) United States Patent
Yoon et al.

(10) Patent No.: US 10,882,459 B2
(45) Date of Patent: Jan. 5, 2021

(54) APPARATUS FOR FIXING VEHICLE ROOF BAR

(71) Applicants: Il Shik Yoon, Seoul (KR); Jun Chan Yoon, Seoul (KR)

(72) Inventors: Il Shik Yoon, Seoul (KR); Jun Chan Yoon, Seoul (KR)

(*) Notice: Subject to any disclaimer, the term of this patent is extended or adjusted under 35 U.S.C. 154(b) by 77 days.

(21) Appl. No.: 16/463,987

(22) PCT Filed: Aug. 24, 2017

(86) PCT No.: PCT/KR2017/009240
§ 371 (c)(1),
(2) Date: May 24, 2019

(87) PCT Pub. No.: WO2018/097456
PCT Pub. Date: May 31, 2018

(65) Prior Publication Data
US 2020/0377029 A1    Dec. 3, 2020

(30) Foreign Application Priority Data

Nov. 28, 2016   (KR) .......................... 10-2016-0158972

(51) Int. Cl.
*B60R 9/052*   (2006.01)
*B60R 9/058*   (2006.01)
(52) U.S. Cl.
CPC .............. *B60R 9/058* (2013.01); *B60R 9/052* (2013.01)
(58) Field of Classification Search
CPC .......... B60R 9/052; B60R 9/058; B60R 9/048
(Continued)

(56) References Cited

U.S. PATENT DOCUMENTS 5,366,128 A * 11/1994 Grim ...................... B60R 9/058
224/322
5,829,654 A * 11/1998 Weger, Jr. ................ B60R 9/04
224/322
(Continued)

FOREIGN PATENT DOCUMENTS

EP    2576292    4/2015
JP    3013636 U    5/1995
(Continued)

OTHER PUBLICATIONS

International Search Report dated Nov. 7, 2017 for PCT/KR2017/009240.
(Continued)

*Primary Examiner* — Scott T McNurlen

(57) ABSTRACT

An apparatus for fixing a vehicle roof bar including: a long roof bar which is disposed horizontally at an interval from a vehicle roof; two buffer members which are in close contact with both window frames of the vehicle, respectively, each have an L-shaped cross section and are each made of an elastic material; two hooks which are fixed to the window frames of the vehicle, respectively, with the buffer members interposed therebetween; two brackets through which both ends of the roof bar protrude by penetrating the two brackets; two stands which are supported on the vehicle roof; and two half-moon-shaped head bolts which each have a half-moon-shaped heads having a half-moon-shaped cross section and fitted into the groove of each of the stands.

2 Claims, 3 Drawing Sheets

(58) Field of Classification Search
USPC .................................................. 224/322, 329
See application file for complete search history.

(56) References Cited

U.S. PATENT DOCUMENTS

| | | | | |
|---|---|---|---|---|
| 5,931,359 | A * | 8/1999 | Zona ........................ | B60R 9/045 224/319 |
| 7,721,925 | B1 * | 5/2010 | Graffy ...................... | B60R 9/058 224/329 |

FOREIGN PATENT DOCUMENTS

| | | |
|---|---|---|
| JP | 07-251681 | 10/1995 |
| JP | 08-238991 | 9/1996 |
| JP | 3189998 | 5/2001 |
| JP | 4188309 | 9/2008 |
| KR | 10-0166572 | 2/1999 |
| KR | 10-2002-0084681 | 11/2002 |

OTHER PUBLICATIONS

Notice of Allowance dated Apr. 23, 2018 corresponding to Korean Patent Application No. 10-2016-0158972.

* cited by examiner ately centered so that the two left and right
APPARATUS FOR FIXING VEHICLE ROOF BAR This application claims the priority of Korean Patent Application No. 10-2016-0158972, filed on Nov. 28, 2016 in the KIPO (Korean Intellectual Property Office), the disclosure of which is incorporated herein entirely by reference. Further, this application is the National Stage application of International Application No. PCT/KR2017/009240, filed Aug. 24, 2017, which designates the United States and was published in Korean. Each of these applications is hereby incorporated by reference in their entirety into the present application.

TECHNICAL FIELD

The present invention relates to an apparatus for fixing a vehicle roof bar, and particularly, to an apparatus for fixing a vehicle roof bar, which enables an ordinary person to easily install a roof bar.

BACKGROUND ART

In general, a vehicle roof bar is fixed to a vehicle roof by two brackets that apply pressure to two sides of the roof bar. FIG. 1 is a cross-sectional view illustrating an example of an apparatus for fixing a roof bar in the related art and illustrating left and right sides of the roof bar.

As illustrated, in the related art, a buffer pad 55' is installed under a stand 50' that supports a bracket 40' for supporting a roof bar 10' so that the bracket 40' is rotatable. The buffer pad 55' is supported on a surface of a vehicle roof, and a hook 30', which is fixed to a window frame of a vehicle, is fixed to the bracket 40' from a lateral side by tightening a fixing bolt 35' into the hook 30'. The stand 50' and the buffer pad 55' are enlarged in the drawing as indicated by the arrow. The buffer pad 55' serves to support the stand 50' to prevent damage to the surface of the vehicle roof. Types of dedicated buffer pads vary depending on types of vehicles, and this is because curvatures and shapes of the vehicle roofs vary depending on types of vehicles.

In addition, because the bolt 35' for fixing the hook 30' to the bracket 40' mostly has a head formed with a hexagonal groove, a hexagonal wrench needs to be used to tighten the bolt 35'. In addition, if the two left and right support brackets are not appropriately centered so that the two left and right support brackets are disposed at accurately the same positions when fixing the roof bar 10', the roof bar is not positioned to be perpendicular to a longitudinal axis of the vehicle, which causes a problem in that the roof bar is easily separated when impact or external force is applied while the vehicle travels.

That is, in the related art, it is significantly difficult for an ordinary person to install and fix the roof bar 10' to the vehicle roof because it is difficult to center the roof bar 10' with respect to the left and right sides, and a separate tool such as a hexagonal wrench is required to install the roof bar 10'.

DISCLOSURE OF THE INVENTION

Technical Problem

The present invention has been contrived in consideration of the above-mentioned problems in the related art, and an object of the present invention is to provide an apparatus for fixing a vehicle roof bar, which is structured to prevent a roof bar from being easily separated even though the roof bar is not accurately centered, and enables an ordinary person to easily install and disassemble the roof bar without using a separate tool.

Technical Solution

The above-mentioned object of the present invention is achieved by an apparatus for fixing a vehicle roof bar, which is configured to fix a roof bar installed on a vehicle roof, the apparatus including: a long roof bar 10 which is disposed horizontally at an interval from the vehicle roof; two buffer members 20 which are in close contact with both window frames of the vehicle, respectively, each have an L-shaped cross section and are each made of an elastic material; two hooks 30 which are fixed to the window frames of the vehicle, respectively, with the buffer members 20 interposed therebetween, each have an L-shaped cross section, are each made of metal or hard plastic, and each have a contact portion which is in contact with each bracket 40 and perpendicular to the ground surface; two brackets 40 through which both ends of the roof bar 10 protrude by penetrating the two brackets 40 and which each have a ⊏-shaped cross section and an outer surface supported by each of the two hooks 30 such that the two brackets 40 are fixed uprightly at an interval from the vehicle roof; two stands 50 which are supported on the vehicle roof, each have a half-moon-shaped groove 52 formed at an upper end of each of the two stands 50 and having a half-moon-shaped cross section, are positioned immediately under the brackets 40, each have multiple protruding portions 54 formed at a lower end of each of the two stands, and are each made of an elastic material; and two half-moon-shaped head bolts 60 which each have a half-moon-shaped heads 62 having a half-moon-shaped cross section and fitted into the groove 52 of each of the stands 50, each have a screw thread formed on a body thereof and are each screwed into each of the brackets while penetrating each of the brackets 40 in an assembled state, in which the roof bar 10 is fitted into horizontal portions of the brackets so that ends of the roof bar 10 protrude, in a state in which the two brackets 40 are in close contact with the hooks 30 and fixed by first fasteners, the roof bar 10 is fixed to the brackets 40 by second fasteners, the half-moon-shaped head bolts 60 are fixed uprightly to the stands 50, the half-moon-shaped head bolts 60 are screwed into the brackets 40, and the half-moon-shaped head bolts 60 are tightened to the brackets 40 by nuts, such that the roof bar 10 is fixed by being bidirectionally tightened in a horizontal direction and a vertical direction.

In the present invention, the half-moon-shaped head bolts 60 may be tightened to the brackets 40 by using nuts at threaded portions of the half-moon-shaped head bolts 60 exposed to opening portions 46 at middle portions of the brackets 40.

Advantageous Effects

According to the apparatus for fixing a roof bar according to the present invention which is configured as described above, even a non-professional ordinary person may easily install and disassemble the roof bar without using a separate tool.

MODE FOR CARRYING OUT THE INVENTION

Figure 1:
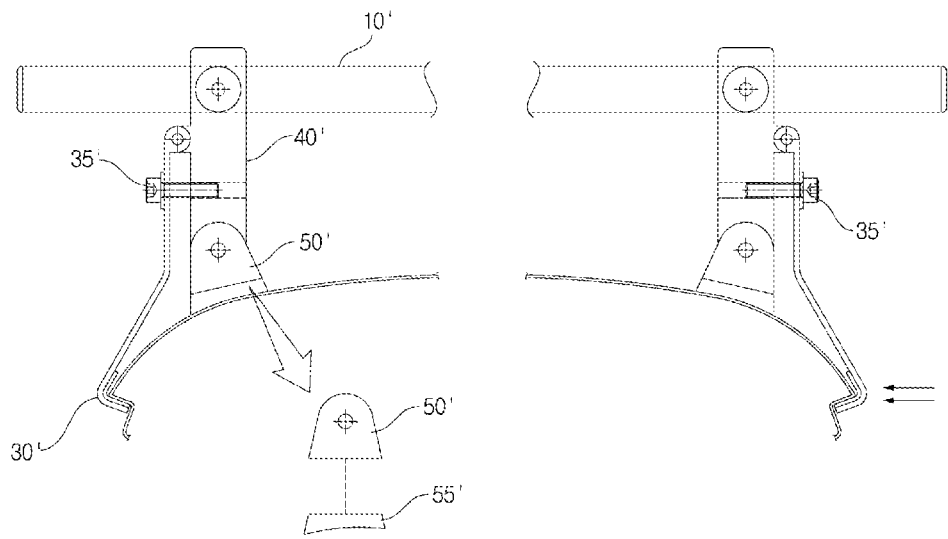
FIG. 1 is a cross-sectional view illustrating an example of an apparatus for fixing a roof bar in the related art.
Figure 2:
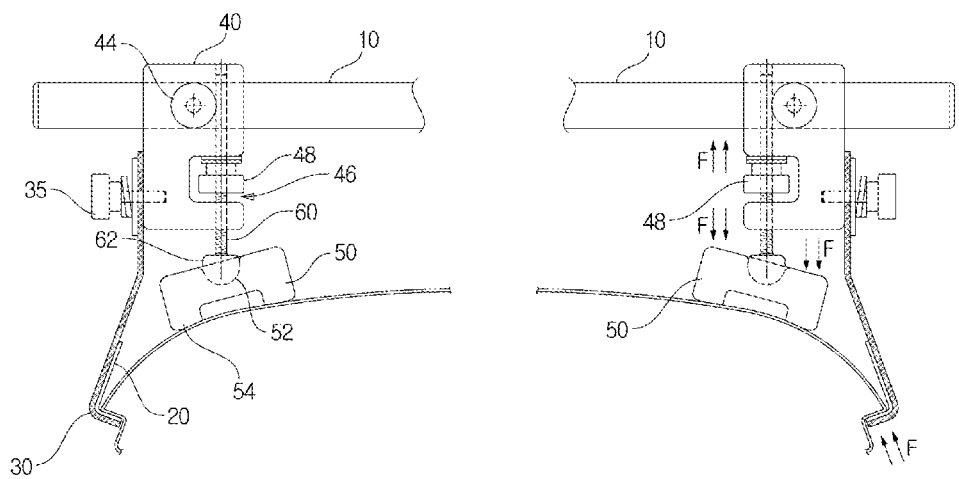
FIG. 2 is a cross-sectional view illustrating a state in which the apparatus for fixing a roof bar according to the present invention is installed.

FIG. 2 is cross-sectional views illustrating left and right sides of a vehicle roof and illustrating an apparatus for fixing a roof bar according to the present invention.

As illustrated, the apparatus for fixing a roof bar according to the present invention is equally applied to two door frames and a roof portion of a vehicle.

The apparatus for fixing a vehicle roof bar according to the present invention includes a roof bar 10, buffer members 20, hooks 30, brackets 40, stands 50, and half-moon-shaped head bolts 60, and the two buffer members 20, the two hooks 30, the two brackets 40, the two stands 50, and the two half-moon-shaped head bolts 60 are configured as one set except for the roof bar 10.

As illustrated in the left side of FIG. 2, the roof bar 10 is a long bar-shaped member disposed horizontally at an interval from the vehicle roof.

In order to prevent a vehicle surface from being scratched or damaged when fixing the roof bar 10, the buffer member 20 is in close contact with a window frame of the vehicle. The buffer member has an L-shaped cross section and is made of an elastic material. The hook 30 is in close contact with the window frame of the vehicle with the buffer member 20 interposed therebetween. The hook 30 has an approximately L-shaped cross section and may be made of metal or hard plastic. The hook 30 may have a middle portion which is slightly curved so that a portion of the hook 30, which is in contact with the bracket 40, is perpendicular to the ground surface.

As illustrated in FIG. 2, the bracket 40 is installed on a lateral surface of the hook 30 in a direction perpendicular to the vehicle roof, and the bracket is fixed to the hook 30 by tightening a bolt 35. A knob bolt, which may be manipulated manually by a person, may be used as the bolt 35. The bracket 40 has a ⊏-shaped cross section, and in an assembled state, an end of the roof bar 10 protrudes by penetrating an upper end horizontal portion of the bracket 40. In this case, the roof bar is fixed to the bracket as a knob bolt 44 is coupled to the roof bar 10 through the bracket from the front side of the bracket 40.

The stand 50 is supported on the vehicle roof under the protruding portion of the bracket 40. A groove 52 having a half-moon-shaped cross section is formed at an upper end of the stand 50. The stand 50 is made of an elastic material containing rubber to prevent damage to a surface of a vehicle body. Specifically, multiple protruding portions 54 may be formed at a lower end of the stand 50. In more detail, protruding legs may be formed at four edges of the lower end of the stand 50. In this case, the protruding legs may support the roof surface even though the vehicle roof has any shape, and as a result, the stand may be used regardless of the types of vehicles.

During an assembly process, the half-moon-shaped head bolt 60 stands upright on the half-moon-shaped groove 52 of the stand 50, that is, the half-moon-shaped head 62 of the bolt is coupled to the groove 52 so that the half-moon-shaped head bolt 60 stands upright, and a body of the bolt having a screw thread is screwed into the bracket by penetrating the bracket 40 in the assembled state. The bolt 60 may be configured to pass a lateral side of the roof bar without interfering with the roof bar 10 when the bolt 60 vertically penetrates the bracket 40. Since the head 62 of the bolt 60 has the half-moon shape and the groove 52 also has the half-moon shape, the bolt 60 may rotate somewhat at an angle in the groove 52 when viewed from the left and right sides in FIG. 2, and as a result, the bolt 60 may be easily screwed into the bracket even though the two brackets are not accurately aligned.

Meanwhile, the bracket 40 has an opening portion 46 at a middle portion of the bracket 40, such that a nut 48 may be coupled to the threaded portion of the bolt 60 through the opening portion 46. A knob nut, which may be manipulated manually by a person, may be used as the nut 48. As illustrated at the right side in FIG. 2, when the knob nut 48 is tightened, the stand 50 is pushed downward as the knob nut 48 is coupled to the bracket 40, the roof bar 10 coupled to the bracket 40 is pushed upward, and the hook 30 is pushed upward with respect to the window frame, such that forces F are applied in the directions indicated as the three arrow directions in the drawing. As the knob nut 48 is tightened in this way, the forces are applied in the three directions, such that a stable coupled state of the roof bar 10 is maintained.

Figure 3A:
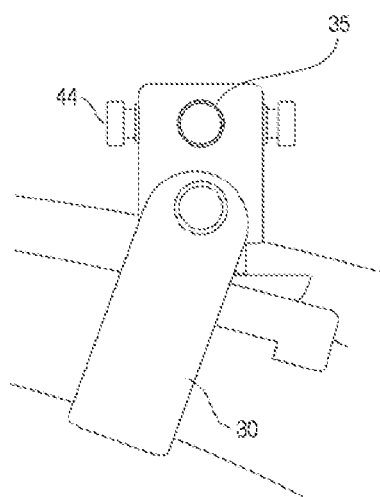
FIGS. 3A and 3B are left and right side views of FIG. 2, respectively.
Figure 3B:
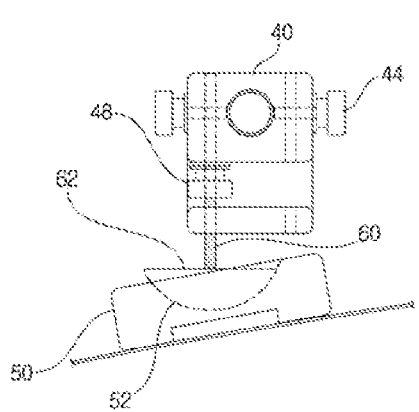

A function of the half-moon-shaped head bolt according to the present invention, which is configured as described above, will be described with reference to FIG. 3. FIG. 3A is a left side view of FIG. 2, and FIG. 3B is a right side view of FIG. 2.

As illustrated in FIG. 3, since the half-moon-shaped head 62 of the bolt 60 may rotate in the coupled state in the groove 52, the hook 30 may be freely mounted even on any type of vehicle. That is, the apparatus according to the present invention may be used for all types of vehicles regardless of types of vehicles. Because of the shape of the half-moon-shaped head of the bolt 60 disposed in this manner and the shape of the groove, the knob nut 48 may be tightened with respect to the bolt when the knob nut 48 is tightened in a state in which the bolt 60 spins without traction, such that the roof bar 10 may be securely fixed as the forces F are applied in the three directions as described above.

Figure 4:
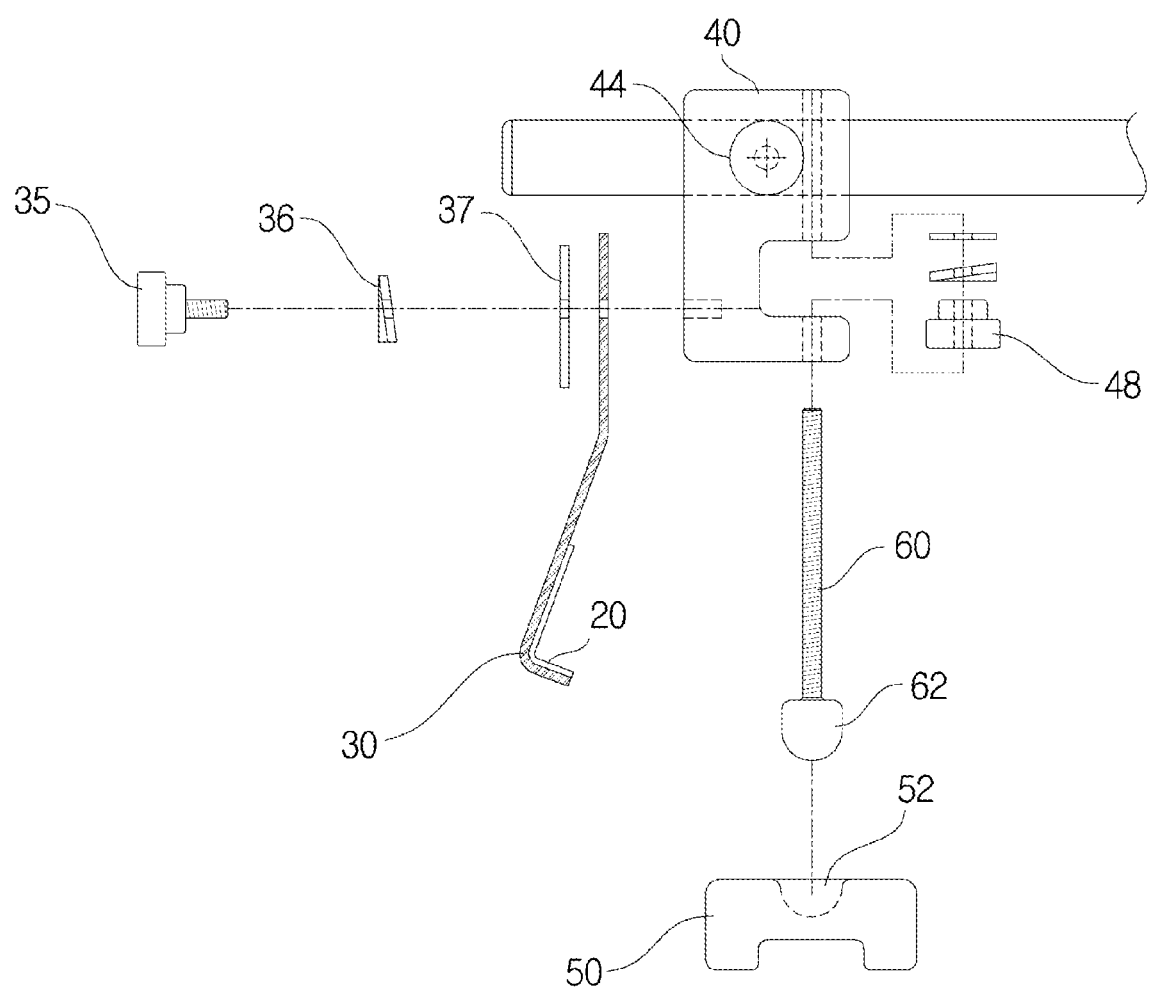
FIG. 4 is an exploded perspective view of a left fixing device.

FIG. 4 is an exploded perspective view of the left fixing device.

As illustrated, a spring washer 36 may be used to prevent, the knob bolt 35, which is tightened to couple the bracket 40 to the hook 30, from being loosened. A large-sized washer 37, which widely disperses the force of the knob bolt 35 applied to the hook 30, may be additionally used to further reinforce a supporting force applied to the hook 30 and prevent a bent portion, which is curved at the middle portion, from being straightened by external force in use. Of course, a spring washer and a plain washer may be further used even when the knob nut 48 is tightened, in order to prevent the knob nut 48 from being loosened.

Figure 5:
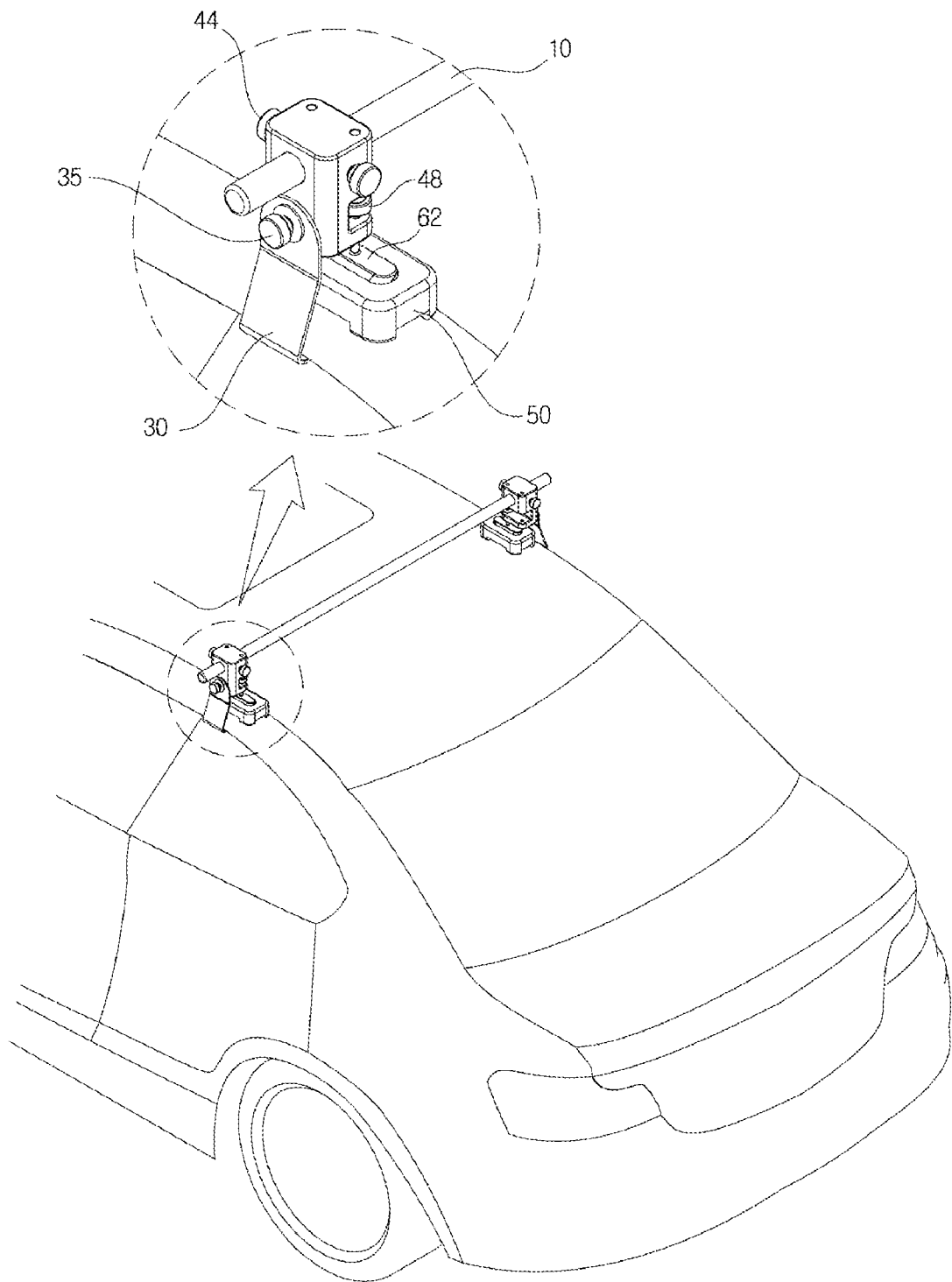
FIG. 5 is a perspective view illustrating an installation state of the present invention.

FIG. 5 is a perspective view and a partially enlarged view illustrating a state in which the roof bar 10 is fixed to the vehicle roof in accordance with the present invention.

As illustrated, the roof bar 10 may be securely fixed to the vehicle roof as the roof bar 10 is fitted into the bracket 40 and then the knob bolts 35 and 44 and the knob nut 48 are tightened. With the function of the half-moon-shaped head 62, it is not necessary to accurately align positions of both ends of the roof bar 10. Accordingly, it is possible to more safely protect the roof bar from impact and vibration while the vehicle travels.

The invention claimed is:

1. An apparatus for fixing a vehicle roof bar, which is configured to fix a roof bar installed on a vehicle roof, the apparatus comprising:
   a long roof bar which is disposed horizontally at an interval from the vehicle roof;
   two buffer members which are in close contact with both window frames of the vehicle, respectively, each have an L-shaped cross section and are each made of an elastic material;
   two hooks which are fixed to the window frames of the vehicle, respectively, with the buffer members interposed therebetween, each have an L-shaped cross section, each are made of metal or hard plastic, and each have a contact portion which is in contact with two brackets and is perpendicular to the ground surface;
   both ends of the roof bar protrude through the two brackets by penetrating the two brackets, the two brackets each have a ⊏-shaped cross section and an outer surface supported by each of the two hooks such that the two brackets are fixed uprightly at an interval from the vehicle roof;
   two stands which are supported on the vehicle roof, each have a half-moon-shaped groove formed at an upper end of each of the two stands and have a half-moon-shaped cross section, each are positioned immediately under the brackets, each have multiple protruding portions formed at a lower end of each of the two stands, and each are made of an elastic material; and
   two half-moon-shaped head bolts which each have a half-moon-shaped head having a half-moon-shaped cross section and fitted into the groove of each of the stands, each have a screw thread formed on a body thereof and each are screwed into each of the brackets while penetrating each of the brackets in an assembled state,
   wherein the roof bar is fitted into horizontal portions of the brackets so that ends of the roof bar protrude, in a state in which the two brackets are in close contact with the hooks and fixed by first fasteners, the roof bar is fixed to the brackets by second fasteners, the half-moon-shaped head bolts are fixed uprightly to the stands, the half-moon-shaped head bolts are screwed into the brackets, and the half-moon-shaped head bolts are tightened to the brackets by nuts, such that the roof bar is fixed by being bidirectionally tightened in a horizontal direction and a vertical direction.

2. The apparatus of claim 1, wherein the half-moon-shaped head bolts are tightened to the brackets by using the nuts at threaded portions of the half-moon-shaped head bolts exposed to opening portions at middle portions of the brackets.

* * * * *